Patented Jan. 31, 1933

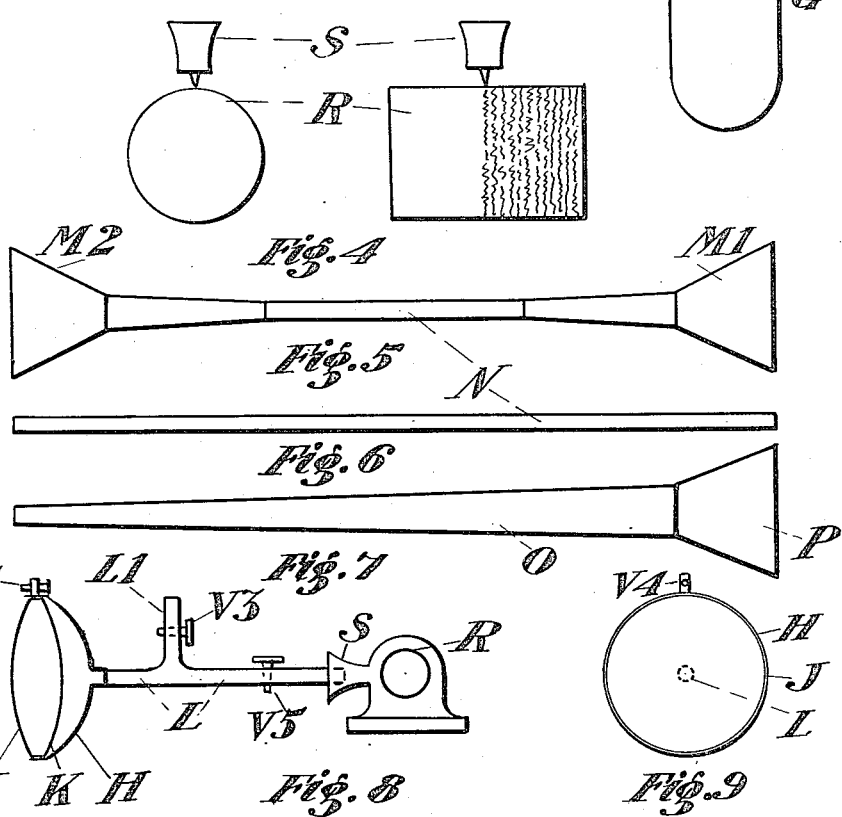

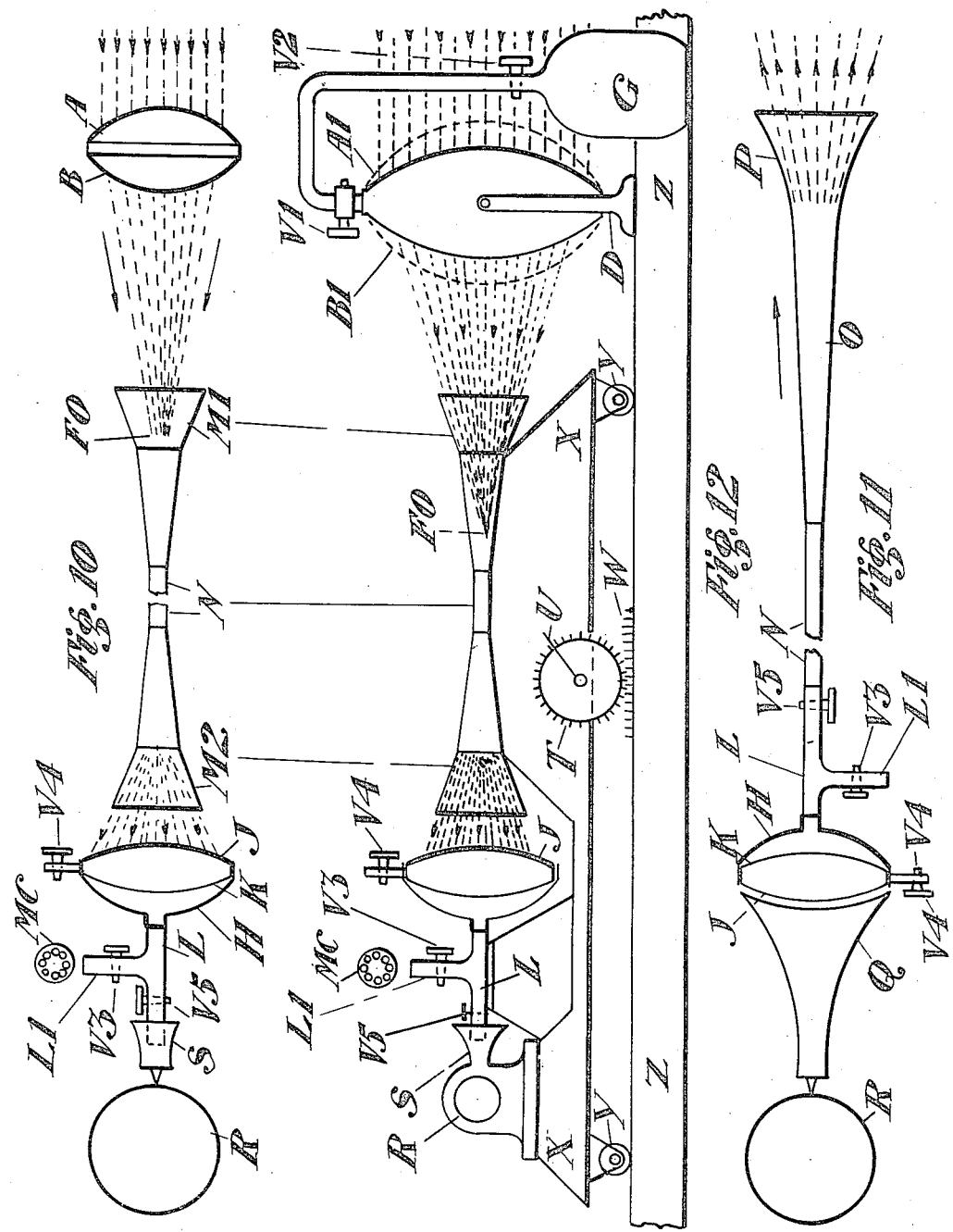

1,895,442

UNITED STATES PATENT OFFICE

WILLIAM RUSHTON BOWKER, OF CORONADO, CALIFORNIA

SOUND CONTROL AND TRANSMISSION SYSTEM

Application filed March 13, 1930. Serial No. 435,611.

My invention relates to improvements in the control of sound wave energy or acoustic vibrations and its transmission to desirable locations for utilization in the motion picture industry allied with sound or acoustic effects, in which the motion picture acting is synchronized with the audible sound for amusement, educational and other useful purposes.

The objects of my improvement are: firstly; to simplify the control, operation and utilization of sound waves or acoustic vibration energy; secondly, to operatively control its transmission to desirable locations; thirdly, to confine and conserve the sound waves' energy for the purpose of attaining efficient audibility results; fourthly, to dispense with complicated and expensive electrical amplification apparatus and devices as now used in the sound moving picture art; fifthly, to avoid the necessity of converting sound wave energy into electrical or light energy and then reconverting into sound wave energy; sixthly, to utilize mechanical amplifiers for the purpose of controlling the intensity or loudness of sound wave energy; and seventh, in the broad sense, to provide for the utilization of sound wave energy in its natural, pure tone or audibility effects and attain the highest operative efficiency from the viewpoints of simplicity, economy, control and transmission. I attain these objects by the apparatus illustrated in the accompanying drawings, in which:

Fig. 1 is a side elevation of the sound wave refraction lens.

Fig. 2 is a front elevation of the sound wave refraction lens.

Fig. 3 is a side elevation of the sound wave refraction lens and a reservoir with pipe connection.

Fig. 4 is an end and side elevation in outline of a phonograph recorder.

Fig. 5 is a longitudinal side view of the sound transmission trumpet and tubing.

Fig. 6 is a side view of a transmission tube.

Fig. 7 is a longitudinal side view of the audibility or speaking trumpet.

Fig. 8 is a side elevation of a stethoscope amplifier and sound recorder.

Fig. 9 is a front view elevation of the stethoscope acoustic amplifier.

Fig. 10 is an outline longitudinal side view of a refraction lens, transmission trumpet, tubing, stethoscope amplifier and sound recorder.

Fig. 11 is an outline longitudinal side elevation of a sound reproducer with horn, stethoscope amplifier, transmission tube and speaking or audibility trumpet.

Fig. 12 is a longitudinal side elevation of the refraction focusing lens, refraction medium reservoir, inlet sound transmission tube with trumpet, stethoscope amplifier, sound recorder in assembly on a mounting that provides for adjustability of the focal length of the refraction lens.

Similar letters or numerals refer to similar parts throughout the several views, in which A and B are the faces of the convex refraction lens; C is the pivot; D the supporting stand and E the annular assembly ring of said lens; F is a tube or pipe connection between said lens and reservoir G; H is the hollow hemisphere of a stethoscope and J and K are the convex faces (forming the walls of a hollow lens) supported and fixed to the circular edge of said hemisphere H; L is a pipe or tubing assembled to said stethoscope provided with a by-pass L1 and valve V3; M1 and M2 are the bell ends of a combined ear and speaking trumpet provided with a pipe or tubing N; and O is a speaking trumpet with bell end P; while Q is the conical horn of the phonograph reproducer R; and S is the inlet horn of acoustic recorder R; T is a gear wheel provided with handle U which wheel gears in with gear rack W; X is an assembly framework movable on rollers Y which traverse a platform Z. MC is a microphone; V1 is the valve or stop cock of convex lens AB; V2 the valve or stop cock of reservoir G; V3 the valve or stop cock of by-pass L1 and V4 the valve or stop cock of the stethoscope. V5 is a stop cock in tube L. FO is the focus of the sound waves. The dotted lines show the sound waves at location A where they impact on the refraction lens, and at P where said sound wave energy exits from said speaking or audition trumpet O; and the arrows indicate the direction of said sound throughout the sequence of sound control and transmission.

I prefer to carry out the feature of my invention as shown, but it is not my intent that the spirit of the invention should be sacrificed or jeopardized due to any lack of minute details or slight changes in assembly.

Several scientific facts are involved in the sequence operation of the control and transmission of sound wave energy. A sound wave refraction lens as shown in Figs. 1—3—10 and 12 functions to converge sound or acoustic vibrations to a focus. The focal length of the lens, i. e. the linear distance FO from the face B of the lens is determined by the radius of curvature of the lens' surfaces and the refractive index or density of the gas, liquid or other medium enclosed in the lens if hollow, or of the material of which the lens is made if solid. Gases with a greater density than air possess the property of causing sound waves to be refracted. Carbon dioxide or carbonic acid gas function as a refracting medium. Thus when sound waves pass from one medium to another their direction is changed and said to be refracted, and the laws which govern the refraction of sound are the same as those in the case of light. Sound waves can be refracted and brought to a focus if they pass through a converging lens filled with a dense gas such as the said carbon dioxide or carbonic acid gas. Converging lens can be double-convex, plano-convex, or a convexo-concave (convex meniscus); the one shown in Figs. 1—3—10 and 12 being a double-convex lens. It is a scientific fact that sound wave energy emanating from a sound source, after impinging on the lens at A, undergoes refraction and becomes converged to a focus at FO. Thus the sound waves that impact the surface area of the lens can be converged to an approximate point, resulting in increased audibility effects, which is an invaluable feature in the control of sound waves, due to the localizing of said sound waves and also functioning to collect the sound wave vibrations over an extensive area (as determined by the square inch or square feet area of the lens surface), and converging or focusing to said desired location.

The focussed sound waves enter at the opening M1, Figs. 10 and 12, of the sound transmitting trumpet, designed along similar lines, to an ear trumpet, shown M1 in Fig. 4. This trumpet is essentially an inverted audibility or speaking trumpet shown at M2, Fig. 5, and OP, Fig. 7. The inlet so-called ear trumpet consists of a conical shaped tube, one of whose ends terminates in a bell M1 which receives the sound, whilst the small diameter end connects with a transmission tube N. The focussed sound waves at FO, which enter the bell-shaped mouth at M1, are transmitted and reflected from the sides of the trumpet, the cross-section of the wave-front decreasing to a cross-section area as determined by the diameter of the transmission tube N. Since the loudness of the sound waves increases as the cross-section of the air in which they are transmitted decreases, the resulting loudness is greater than if this converging or concentration had not occurred. The trumpet M1, due to its shape acting as an ear trumpet, functions to converge and confine the sound wave energy in a wave-front of small diameter with resulting increased intensity and loudness. The sound wave energy after transmission through the tube N, Figs. 10 and 12, exits or emerges through a speaking or audibility trumpet M2 which functions to permit sound wave energy of increased wave front area to impact the face J of the stethoscope, Figs. 10 and 12. The trumpet or bell-shaped outlet at M2 functions to provide increased audibility effects due to the fact that the bell M2 confines a large mass of air which is energized in consonant vibration that impinges or impacts the face J of said stethoscope, which is a very sensitive acoustical amplifier of sound energy. Its usual assembly comprises two membranes or circular discs of india rubber or other suitable material possessing flexible elastic properties JK (Figs. 8—9—10—11 and 12) which are fixed to the circular edge of a hollow metal hemisphere H, provided with one or a plurality of tubes L, L1 attached to a tubular opening in H. Located on the edge of H is a valve or stop cock V4, which opens into the reservoir enclosed by the membranes JK, which provides a means to permit of the inflation of said reservoir, which assumes the shape of, and forms, a double convex lens. The stethoscope functions as an amplifier because the flexible membranes respond to the impact of sound wave energy, the vibrations of which are transmitted to the air enclosed in the chamber between the flexible membrane K and the hemisphere H. Due to amplification, increased audibility effects result by the dual functioning of the stethoscope which acts, first; to collect the sound wave energy over a considerable impact area and, secondly; transmits said energy vibrations through the mass of enclosed air, which vibrations are converged into a wave front area of decreased diameter with increased loudness. The stethscope is such a sensitive acoustical instrument, and its amplification properties so great, that the most minute sounds become distinctly audible through one or a plurality of tubes, if connected thereto.

With the object of controlling the intensity or loudness of sound or audibility effects that emerge at the outlet end of stethoscope tube L, there is a by-pass tube L1 provided with a stop cock or valve V3, the opening or closing of which operates to provide adjustability features. The outlet end of tube L (Figs. 10 and 12) enters the inlet horn S of the phonograph or sound wave recorder R, or, if a sensitive microphone MC or other electrical transmitter of sound wave energy is utilized, the outlet of tube L can be assembled or located to function in combination with said microphone MC or any other suitable appliance whether electrical, mechanical or optical, which may utilize the energy of sound wave pulsations by conversion to electrical or light wave energy or vibrations.

Located in tube L is a valve or stop cock V5 which provides for the opening and closing of tube L, so that a variable aperture adjustment results. This operatively functions to attain desirable adjustability features so as to control the sound wave energy from diminuendo to crescendo, or varying degrees of loudness for recording purposes.

The combination assembly as shown in Figs. 10 and 12 also provides for the recording of sound simultaneously by both the well known mechanical phonograph and electrical microphone methods; where MC shows a microphone efficiently located close to the stethoscope by-pass tube L1, the valve V3 of which provides for adjustability features as explained. The assembly also operatively provides for a condition whereby sound can be recorded separately, viz., by the microphone method, in which case valve V5 in tube L would be closed and valve V3 in L1 partially or wholly opened for operation on the microphone, or, if the phonograph method only is desired for recording, valve V3 in by-pass tube L1 can be closed, and valve V5 in tube L partially or wholly opened. The microphone MC will pick up sounds coming from the tube L1, and the vibrations of the diaphragm then cause secondary currents to be induced in an electric circuit for the transmission of sound as in a telephone. These secondary currents can be then transmitted to any of the well known pick-up mechanisms for vibration of a diaphragm arranged to make impressions on a soft cylinder, plate, wire, or other record element, by means of a stylus or other suitable recording device, as in any of the various sound recording apparatus in use.

The combination assembly can be utilized for a flexibility of operation, first: To record only by the phonograph or other mechanical recording method. This operation would involve the closing of the by-pass circuit L1 by means of valve V3, and locating the phonograph at the outlet end of tube L controlled by valve V5; secondly: To record only by the microphone or other electrical method. This operation would involve the choice of two locations, viz., either to locate the microphone at the outlet of tube L controlled by valve V5, with by-pass circuit L1 inoperative, or to locate the microphone at the outlet L1 of the by-pass circuit controlled by valve V3 with the main circuit L inoperative; thirdly: To record by the microphone method in plurality by locating the appliance at the outlet of L1 controlled by valve V3, and at the outlet L controlled by valve V5, or any number of tube outlets; fourthly: To record by the phonograph method located at outlet L controlled by valve V5, simultaneously with the electrical or microphone method located at outlet L1 controlled by valve V3.

It is self-evident and obvious that any number of combinations can be operated during recording, either singly, in plurality, and simultaneously. During the operation of recording, the sound wave energy emanating from its source impacts the lens' surface A (Figs. 10 and 12), the area of which may be several square feet. The energy vibrations are transmitted through or by the refracting medium. The sound wave energy is refracted and after emerging at convex surface B of the lens AB is converged to a focus FO (Figs. 10 and 12) the said focussed sound energy being transmitted through the inlet M1, tube N, outlet bell M2, impacting convex membrane J of the stethoscope, becoming amplified and emerging through tubing L or L1 (or both), finally acting on the phonograph (or other mechanical recorder of sound), microphone or other apparatus used for recording sound. In the sequence of the control and transmission of sound energy from its source to the operation of recording, the energy is collected over an extensive impact area, converged, focussed and amplified, the focal length of which is controllably adjustable and the amplification controllably adjustable. The sound wave energy emerging at the outlet ends of L or L1 (Figs. 8—10 and 12) of the stethoscope can be operatively controlled to attain increased or decreased loudness or audibility effects for recording purposes by the controllable adjustability of the valve openings or apertures V3 and V5 located in tubes L1 and L. The focal length is controllably adjustable by two methods, one due to increased refraction which is attained by increasing the gas pressure and amount of gas or refracting agent in convex lens AB (Fig. 1—3—10 and 12) so that the convex lens becomes inflated and distends to assume a shape approximating to A1 B1 shown in Fig. 12. This would lessen the linear distance of the focus FO (i. e. a shorter focal length). To attain this increased inflation and adjustable radius of curvature of the lens AB so that it assumes the shape or form A1 B1, the valves V1 of the convex lens, and valve V2 of the gas or refraction agent reservoir G, are controllably adjusted (Figs. 3 and 12). To adjust the transmitting and recording assembly to conform to a variable focal length (which is the second method) the apparatus is assembled on a framework XX supported on rollers YY free to move on a platform ZZ. The relative distance between the convex refraction lens AB (Fig. 12) and the inlet M1 (Fig. 12) is controllable and adjusted by rotating the handle U of gear wheel T meshed in gear rack W (Fig. 12) which operates to cause the assembly and bell trumpet M1 on XX to traverse the platform ZZ (Fig. 12) towards or away from lens AB.

The aforesaid describes in sequence the apparatus and explains the control and transmission of sound or acoustic energy from the source of emanation to its recording, as outlined in Figs. 10 and 12.

In the reproduction, control and transmission of sound for efficient audibility purposes, especially over considerable linear distance, the said transmission involves the factor to avoid or prevent appreciable loss of intensity or decreased loudness due to the law of inverse squares. The said loss is prevented by transmitting the sound waves or acoustic vibrations from the reproducing device to the audibility location through tubes of small diameter, in combination with the amplifying stethoscope, preferably in the sequence as outlined in Fig. 11. The reproducing device shown in Fig. 11 is operatively the reverse of the recording device shown in Figs. 8—10 and 12. The reproduced sound wave vibrations outlet from the horn Q, impacting the membrane J of amplifying stethoscope; then into a transmission tube N (Fig. 11) which functions as an essentially important cooperative member or element of the operative system, because as a sound transmitting member it confines the sound wave energy in a wave front of small diameter. The tubing member or element is operatively the keystone of the cooperative transmission system because it provides for and serves the purpose whereby sound wave energy or acoustic vibrations can be transmitted over comparatively long distances (several hundreds of linear feet) with very slight loss or appreciable decreased intensity or loudness in audibility due to said confining of said sound energy in a wave front of small diameter.

When sound waves emanate from a source and travel in the open air, the intensity or loudness of the sound is inversely as the square of the distance of the sounding body from the ear. However, this inverse square law does not apply in the case of tubes, especially if they are straight and cylindrical, of small diameter and smooth inside. The sound waves are not propagated in the form of increasing concentric spheres, and sound can be transmitted to distances of several hundred feet and upwards in tubes, without any perceptible diminished intensity or decreased loudness. This efficient functioning of tubes is due to the fact that the sound waves (instead of spreading out in spheres as they would do in the open air) are by reflection at the sides of the tube, confined within the tube so that they travel forward with comparatively small decrease in amplitude, the wave-front remaining of the same cross-section of the tube throughout.

If the transmitting distance is considerable, it may be advisable to again amplify by connecting the transmission tubing to additional amplification stethoscopes. In the outline system shown in Fig. 11 one such amplifying stethoscope is shown. It is therefore obvious that a series of relay amplification stethoscopes can be utilized as determined by the sound transmission problem that needs to be solved, which would depend upon the distance from the sound reproducer to audition source and the size or area of said auditorium. The far end of the transmission tube or amplification stethoscope is connected to the speaking trumpet (shown in Figs. 7 and 11) which terminates in a bell-shaped mouth piece P. The said speaking trumpet is utilized to render audibility effects at considerable distances. The larger the dimensions of this device the more effective it becomes. Its efficiency and resulting audibility is due to the fact that the bell P (Figs. 7 and 11) acts by causing a large mass of air to be energized in consonant vibration before the sound wave energy begins to be transmitted throughout the mass of the open air or auditorium.

The sound control and transmission system as outlined and described is a single line system. Its utility and operation may be extended to comprise a plurality of cooperated reproducing and audition systems, providing for a duplication or multiplicity of control, transmission, amplification, audition and operative elements, members or units. Furthermore, it may embody a relay system of amplification stethoscopes, members or elements. It is the intention of the invention that the field of utility shall be broad in scope and application, especially under conditions where the sound wave energy is propagated as acoustic or audible vibrations in the physical sense due to condensations and rarefactions in the air by virtue of the air medium possessing elastic properties. The idea of the invention is the efficient cooperation of essential apparatus, elements or members, as and for the purposes set forth and described. Incidental details of assembly, such as method of support, etc., have not been described, these details not being material or pertinent to the broad inventive idea involved.

While I have confined my description to a typical assembly of essential elements, it is not my intention to limit myself to any particular form, shape, material or materials, member or members, units or elements, which may be used singly or in plurality as operative requirements necessitate. The size, shape, assembly and cooperation must be such as to produce the most efficient results from the control and operative factors. Its application and utility may extend to other and broader fields in science, art and commerce. I am fully aware that there are elements, apparatus and devices such as refraction lens, recorders, reproducers, tubes, amplifiers and trumpets, but they are not used in cooperative assembly as and for the purposes set forth in my invention. I do not claim any of these devices or elements singly but what I claim is:

1. The method of transmitting sound waves which consists in refracting the sound waves to produce a wave front of small diameter, transmitting the sound wave energy while confined in this small wave front, and subsequently again refracting the sound waves.

2. The method of transmitting sound waves which consists in refracting sound waves to reduce the sound wave energy to a wave front of small diameter, collecting the sound wave energy as thus refracted, transmitting the sound wave energy to a desired point of use while confined in the wave front of small diameter, and controlling and varying the size of the wave front permitted to pass.

3. The method of transmitting and controlling sound waves which consists in refracting sound wave energy to confine the same in a wave front of small diameter, transmitting the confined sound wave energy while held in the small wave front, and controlling the diameter of the wave front allowed to pass for transmission.

4. The method of transmitting and controlling sound waves which consists in catching the vibrations on a refractory lens to reduce the sound wave energy to a wave front of small diameter, catching the reduced front of waves, transmitting the sound wave energy while confined in the wave front of small diameter, and interposing a second refractory lens to intercept and amplify the waves.

5. The method of transmitting and recording sound wave energy which consists in intercepting the sound wave vibrations by a refracting lens to reduce the wave front to a small diameter, transmitting the wave energy while confined in the wave front of small diameter to a recording apparatus to thus minimize losses in transmission, and controlling the diameter of the passing wave front.

6. The method of transmitting and recording sound wave energy which consists in intercepting the sound wave vibrations by a refracting lens to reduce the wave front to a small diameter, transmitting the wave energy while confined in the wave front of small diameter to a recording apparatus to thus minimize losses in transmission, and controlling and varying the flow of sound waves of small front diameter in their passage to the recording apparatus to suit varying conditions of use.

7. The method of transmitting and recording sound wave energy which consists in intercepting the sound wave vibrations by a refracting lens to reduce the wave front to a small diameter, transmitting the wave energy while confined in the wave front of small diameter to a recording apapratus to thus minimize losses in transmission, and intercepting the small wave front by a refracting lens for amplifying the sound wave energy transmitted on the wave front of small diameter during transmission in such degree as may be necessary to reach the requirements of the recording apparatus.

8. Means to control the transmission of sound wave vibrations comprising refracting means to reduce the sound wave energy to a wave front of small diameter, means to confine and transmit such sound wave energy as thus refracted while holding the same on the wave front of small diameter to prevent losses in transmission, and refracting means to which the confining means transmits.

9. Means to control the transmission of sound wave vibrations comprising a refraction lens to receive sound wave energy and refract and reduce the same to a wave front of small diameter, a converging trumpet receiving the refracted sound wave energy, a restricted transmission tube leading from said converging trumpet to a location where the sound wave energy is to be used to hold the wave front of small diameter during transmission and thus reduce transmission losses to a minimum, and refracting means to which the confining means transmits.

10. Means to control and transmit sound wave vibrations comprising a refraction lens to receive sound wave energy and reduce the same to a wave front of small diameter, a converging trumpet to receive the refracted sound wave energy, a transmission tube of small diameter connected with the converging trumpet to conduct the sound wave energy from one location to another and maintain the wave front of small diameter to minimize transmission losses, means to vary the diameter of the wave front permitted to pass, a stethoscope amplifier to which said transmission tube leads, and recording means associated with said stethoscope amplifier.

11. Means to control and transmit sound wave vibrations comprising a refraction lens to receive sound wave energy and reduce the same to a wave front of small diameter, a converging trumpet to receive the refracted sound wave energy, a transmission tube of small diameter connected with the converging trumpet to conduct the sound wave energy from one location to another and maintain the wave front of small diameter to minimize transmission losses, a stethoscope amplifier to which said transmission tube leads, recording means associated with said stethoscope amplifier, and valve means to vary and control the transmission to suit varying conditions of use.

12. Means to control the transmission of sound wave vibrations, comprising a refraction lens to receive the sound wave vibrations and reduce the same to a wave front of small diameter, a transmission tube to receive the refracted sound wave vibrations and transmit the same to a location for use while maintaining the wave front of small diameter to minimize transmission losses, and means including a second lens to amplify the sound wave vibrations at the location of use.

13. Means to control the transmission of sound wave vibrations, comprising a refraction lens to receive the sound wave vibrations and reduce the same to a wave front of small diameter, a transmission tube to receive the refracted sound wave vibrations and transmit the same to a location for use while maintaining the wave front of small diameter to minimize transmission losses, means to amplify the sound wave vibrations at the location of use, and means to control and vary the volume of sound wave vibrations allowed to pass while confined on the wave front of small diameter.

14. Means for transmitting sound wave vibrations comprising an adjustable lens for focusing and reducing the sound wave energy to a wave front of small diameter, means to catch the reduced sound wave vibrations, a transmission tube of small diameter associated with said energy catching means and extending to a location of use to transmit the sound wave energy and confine the same to the wave front of small diameter to minimize transmission losses, a recording apparatus at the location of use, and means interposed between said recording apparatus and the outlet of said transmission tube to intercept the sound wave vibrations carried on the wave front of small diameter and prepare the same for action upon said recording apparatus.

15. Means for focusing and recording sound, comprising a lens interposed to catch sound wave vibrations and refract the same by focusing to a wave front of small diameter, a transmission tube disposed to receive the refracted sound wave vibrations to transmit the same while retained on the wave front of small diameter to thus minimize transmission losses, a stethoscope amplifier including a second lens at the outlet end of said transmission tube disposed to be affected by the sound wave vibrations emanating from said transmission tube on the wave front of small diameter, a recording appliance, and a connection from said stethoscope to said recording appliance to render the same operative by the sound wave vibrations.

16. Means for focusing and recording sound, comprising a lens interposed to catch sound wave vibrations and refract the same by focusing to a wave front of small diameter, a transmission tube disposed to receive the refracted sound wave vibrations to transmit the same while retained on the wave front of small diameter to thus minimize transmission losses, a stethoscope amplifier including a second lens at the outlet end of said transmission tube disposed to be affected by the sound wave vibrations emanating from said transmission tube on the wave front of small diameter, a recording appliance, a connection from said stethoscope to said recording appliance to render the same operative by the sound wave vibrations, and means to control and vary the energy transmitted from the stethoscope to the recording appliance.

17. Means to transmit sound wave vibrations comprising, a refracting lens to catch the sound waves and refract and reduce the same to a wave front of small diameter at a focal point, a converging trumpet conforming to the focal angle and disposed to catch the refracted sound waves with its reduced end terminating substantially at the focal point, and a transmission tube leading from the reduced end of the trumpet to transmit the sound waves while confining the same to the wave front of small diameter.

18. Means to transmit sound waves comprising, a refracting lens of variable focus to catch the sound waves and reduce the same to a wave front of small diameter at a focal point, a converging trumpet mounted with its flared end toward the lens and its throat small end substantially at the focal point, means to vary the disposition of the trumpet, a transmission tube extending from the small end of the trumpet to conduct the sound waves while confining the same to the small diameter, a second trumpet at the other end of the transmission tube, and a second lens at the open flared end of the second trumpet.

WILLIAM RUSHTON BOWKER.